June 26, 1951  G. C. KOCH  2,558,569
BARBECUE MACHINE
Filed Nov. 8, 1948  3 Sheets-Sheet 1
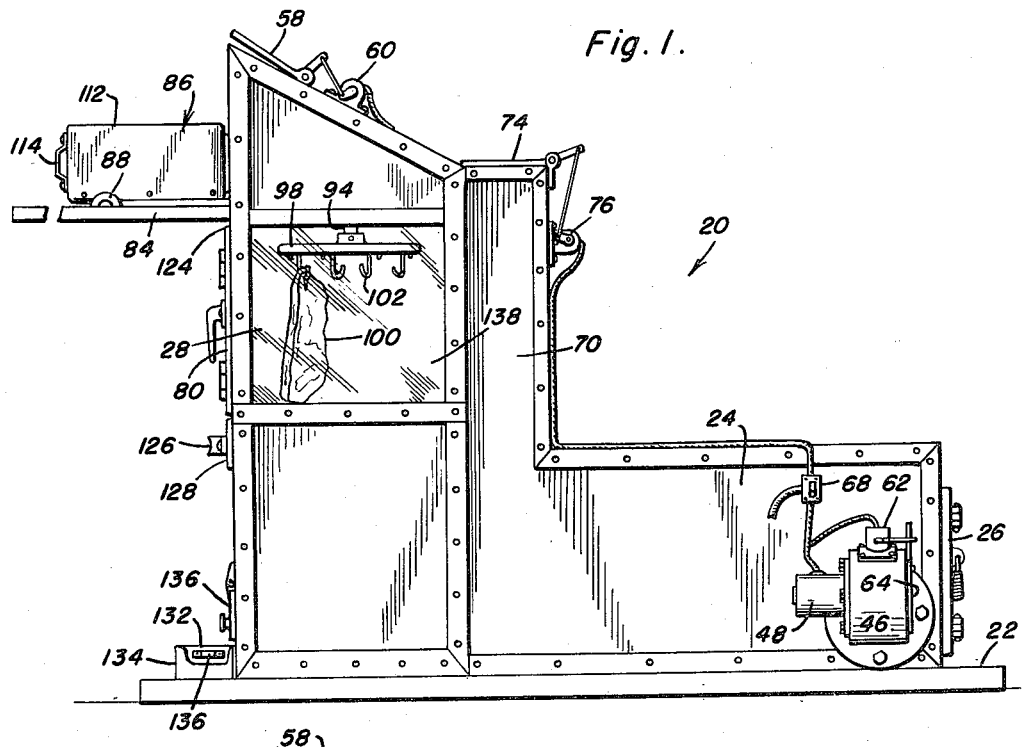
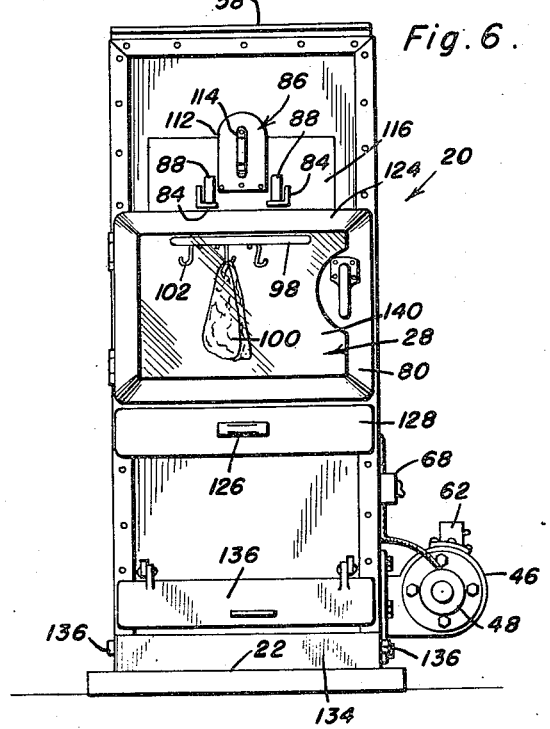
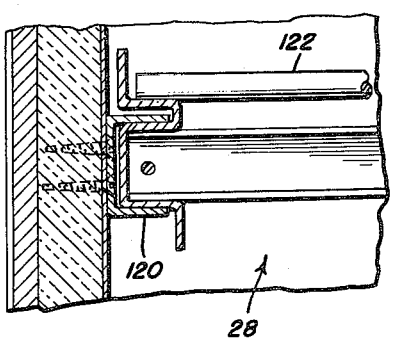
George C. Koch
INVENTOR.

June 26, 1951  G. C. KOCH  2,558,569
BARBECUE MACHINE
Filed Nov. 8, 1948  3 Sheets-Sheet 2

George C. Koch
INVENTOR.

June 26, 1951 G. C. KOCH 2,558,569
BARBECUE MACHINE
Filed Nov. 8, 1948 3 Sheets-Sheet 3

George C. Koch
INVENTOR.

Patented June 26, 1951

2,558,569

UNITED STATES PATENT OFFICE 2,558,569

BARBECUE MACHINE

George C. Koch, Hattiesburg, Miss.

Application November 8, 1948, Serial No. 58,927

4 Claims. (Cl. 99—443)

This invention relates to new and useful improvements and structural refinements in barbecue machines, and the principal object of the invention is to facilitate performance of the barbecuing operation efficiently, expeditiously and automatically, so that the attendant may perform other duties, such as for example, entertaining guests, etc., while the barbecuing operation is in progress.

Primarily, the invention consists of an oven and a fire box communicating therewith, together with means for forcing a current of air through the fire box and oven so that meat placed in the latter is barbecued by the heat from the fire box.

An important feature of the invention resides in the provision of thermostatically controlled means for regulating the draft through the fire box and oven in accordance with the oven temperature.

After the barbecuing operation is completed, the draft producing means is, of course, shut off, and another feature of the invention involves the provision of further, thermostatically controlled means for discharging fumes and excess heat from the fire box through a by-pass into the atmosphere rather than through the oven after the draft producing means are no longer effective.

An additional feature of the invention resides in the particular construction of means for supporting and rotating the meat while in the oven, matters being so arranged that this supporting means may be easily and conveniently withdrawn from the oven for the purpose of placing thereon or removing therefrom the meat.

Some of the advantages of the invention lie in its simplicity of construction, convenience of operation, and in its adaptability to economical manufacture.

With the above more important objects and features in view, and such other objects and features as may become apparent as this specification proceeds, the invention consists essentially of the arrangement and construction of parts as illustrated in the accompanying drawings, in which:

Figure 1 is a side elevational view of the invention;

Figure 6 is a front elevational view of the invention;

Figure 7 is a fragmentary cross-sectional view, taken substantially in the plane of the line 7—7 in Figure 3;

Like characters of reference are employed to designate like parts in the specification and throughout the several views.

Figure 3:
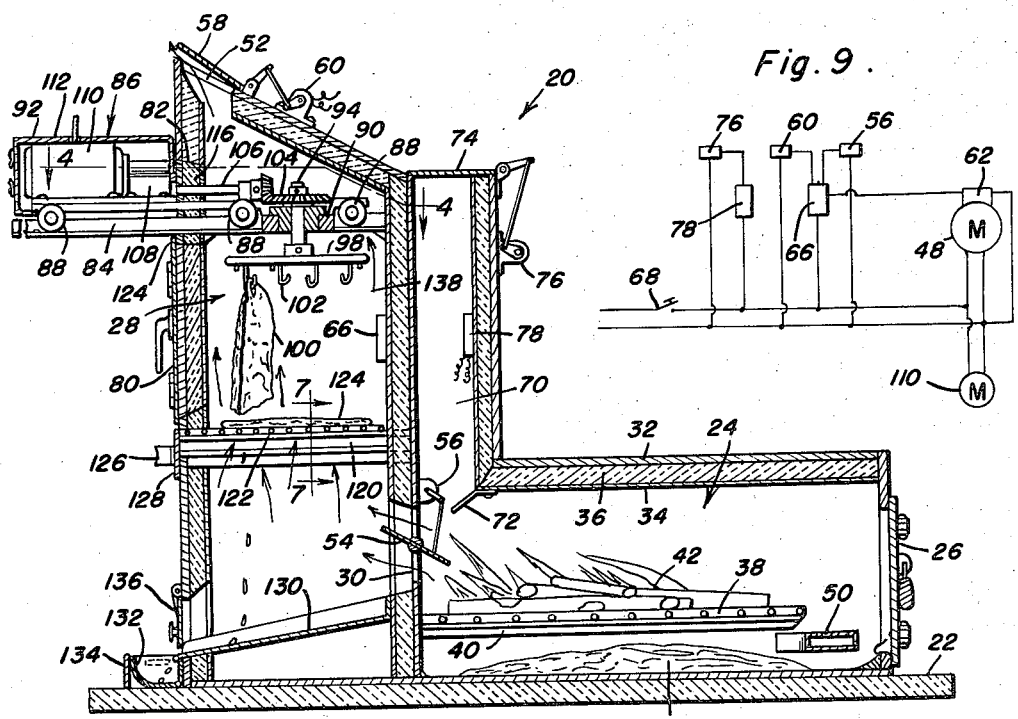
Figure 3 is a cross-sectional view, taken substantially in the plane of the line 3—3 in Figure 2.
Figure 5:
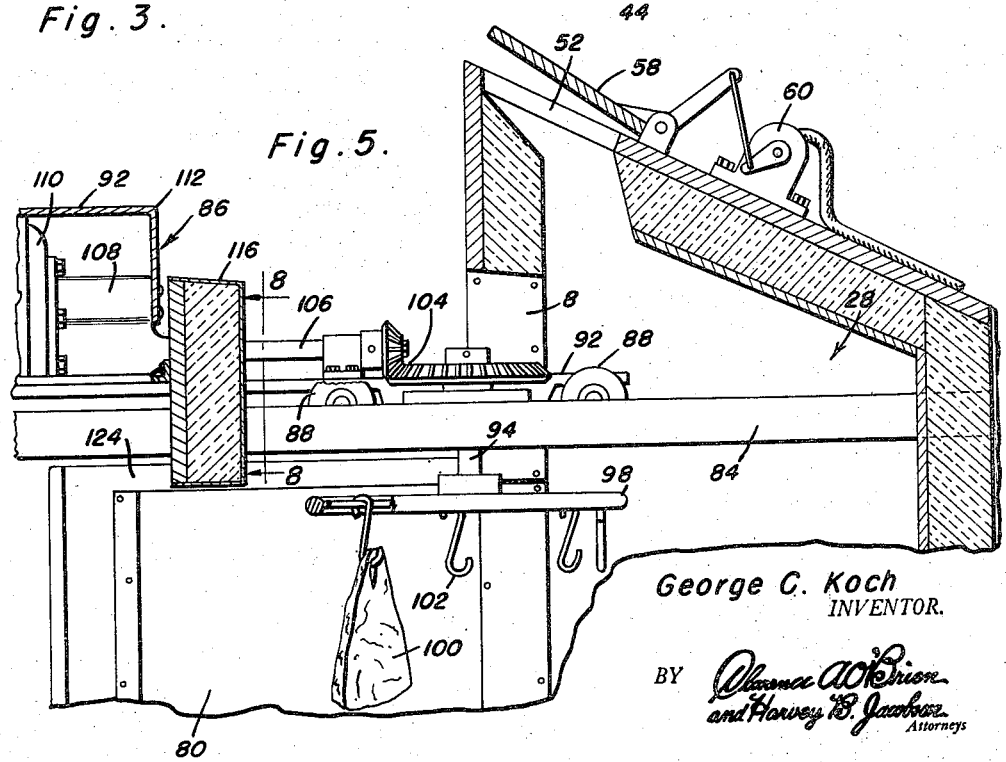
Figure 5 is a fragmentary cross-sectional detail, taken substantially in the plane of the line 5—5 in Figure 4.

Referring now to the accompanying drawings in detail, the invention consists of a barbecueing machine designated generally by the reference character 20, the same preferably being mounted upon a suitable foundation 22 and embodying in its construction a horizontally elongated fire box 24 provided at one end thereof with a suitable door 26, while its remaining end communicates with the lower end portion of a vertically elongated oven 28 through the medium of a passage 30 as shown in Figure 3.

The fire box 24 as well as the oven 28 are provided with spaced double walls as exemplified at 32, 34 in Figure 3, suitable insulating material 36 being interposed between these walls of the fire box and oven in order to safeguard against undue loss of heat.

A suitable grate 38 is positioned on longitudinally extending supports 40 secured to the sides of the fire box 24, (see Figure 3) this grate being intended to receive thereon a charcoal fire 42, or the like, while ashes may accumulate under the grate as at 44.

A suitable blower 46, powered by an electric motor 48, is mounted externally on one side of the fire box 24 and delivers a current of air through a duct 50 discharging into the fire box 24, from which the current of air travels through the passage 30 into the oven 28. Needless to say, the current of air so delivered will be heated by the fire at 42, and after passing through the oven 28, the air is discharged through an outlet opening 52 with which the upper end of the oven is provided.

Figure 9:
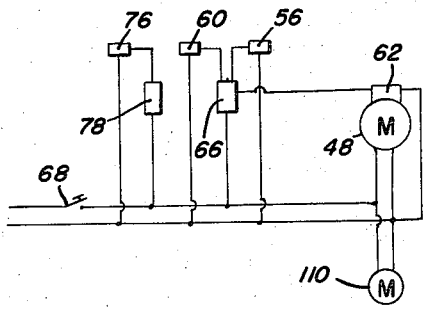
Figure 9 is a wiring diagram of the electrical components used in the invention.

A normally open closure 54, controlled by a variable actuating unit 56 of a suitable conventional type, is provided in the passage 30, while a normally open damper 58, controlled by a further, variable actuating mechanism 60, is provided on the outlet opening 52, substantially as shown. An additional variable actuating mechanism 62, mounted upon the blower 46, controls a normally open closure 64 with which the air inlet of the blower is customarily provided, and as is best shown in Figure 9, each of the actuating units 56, 60 and 62 is connected in series with a common thermostat 66 provided in the oven 28 as shown in Figure 3. Accordingly, when the closures 54, 64 and the damper 58 are open, and a strong current of air is delivered by the blower 46 through the fire box 24 and the oven 28, the temperature in the oven will eventually reach a point where the thermostat 66 will gradually close the damper 58 and the closures 54, 64, thereby decreasing the velocity of the air current and reducing the oven temperature.

The thermostat 66 is connected in parallel with the motor 48 to the electric current supply (see Figure 9) a suitable master switch 68 being interposed into the circuit whereby the operation of the entire machine may be effectively controlled. The switch 68 may be mounted externally on the fire box 24 adjacent the motor 48, as shown in Figure 1.

To avoid undesired heating of the oven 28 and to safeguard against possible overheating of the fire box 24 after the barbecuing operation is completed and the blower 46 shut off, a vertically extending by-pass duct 70 is provided on the fire box immediately adjacent the oven 28, the lower end portion of the duct 70 being equipped with a suitable baffle 72, while the upper end thereof which is in communication with the atmosphere is equipped with a damper 74 (see Figures 1 and 3). The damper 74 is controlled by a variable actuating mechanism 76 which, in turn, is connected in series with a thermostat 78 provided in the by-pass 70 (see Figures 3 and 9). The thermostat 78 is arranged to open the damper 74 at a considerably higher degree of temperature than the thermostat 66 opens the damper 58, and accordingly, when the machine is in operation and the damper 58 as well as the closures 54, 64 are open, the damper 74 is normally closed. However, after the machine is shut off and the temperature in the oven 28 causes the thermostat 66 to close the damper 58 and closures 54, 64, considerable heat may still exist in the fire box 24 and in the duct 70, since the fire at 42 may not be necessarily extinguished. Under such circumstances, the thermostat 78 will open the damper 74, and the excess heat and fumes from the fire in the fire box will be discharged into the atmosphere through the duct 70, as will be clearly apparent.

Figure 2:
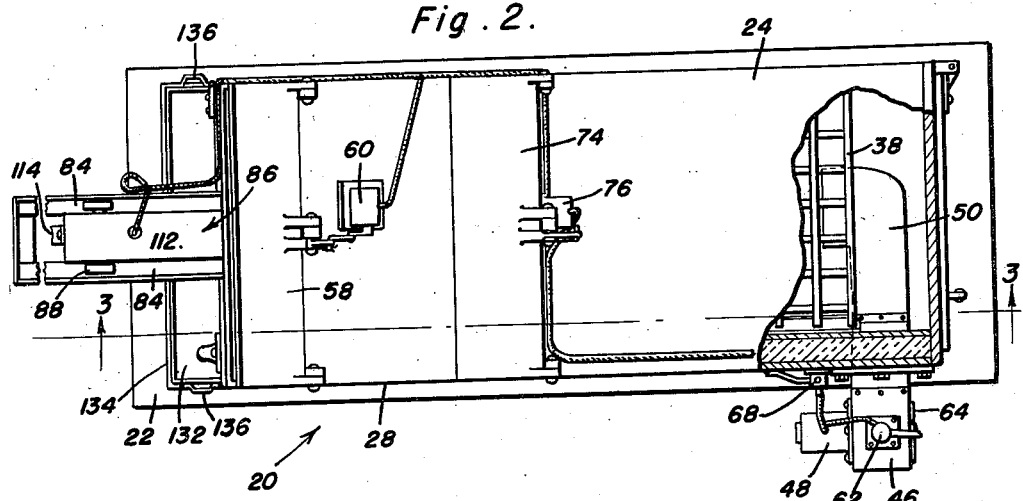
Figure 2 is a top plan view thereof, partially broken away to reveal its construction.
Figure 4:
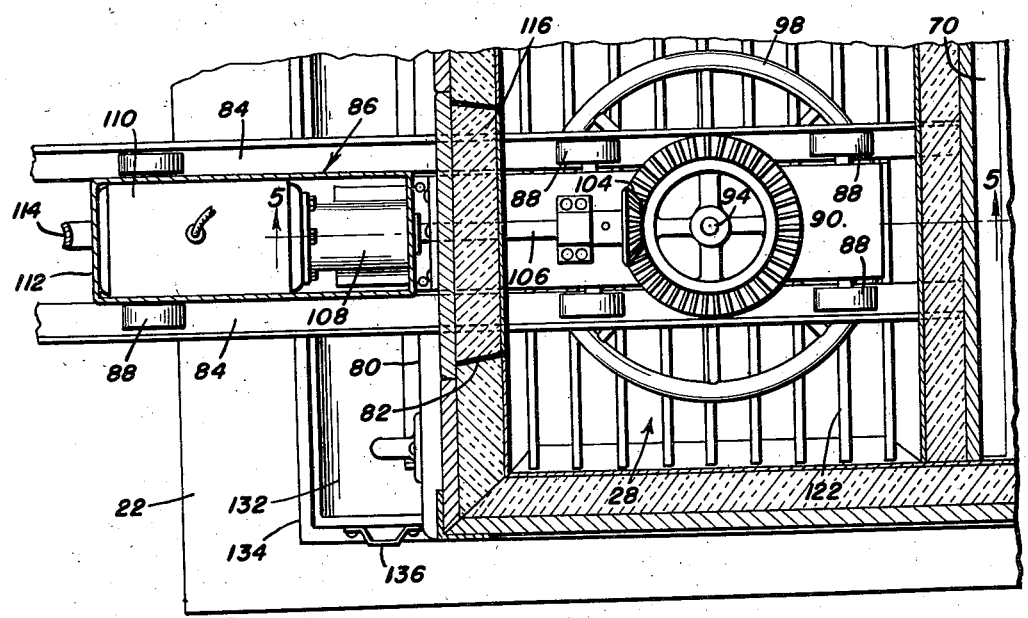
Figure 4 is a fragmentary cross-sectional detail, taken substantially in the plane of the line 4—4 in Figure 3.

The barbecue machine also embodies in its construction means for supporting meat in the oven 28, these means involving the provision of a hinged, outwardly swingable door 80 which is preferably located intermediately the "height" of the oven, and the wall of the oven in which the door 80 is provided is also formed with an opening or recess 82. This recess is disposed above the door opening and constitutes a continuation thereof, although it is somewhat narrower than the door itself. A pair of horizontal rails or tracks 84 is provided in the upper portion of the oven 28 and extend outwardly through the recess 82, substantially as shown. A carriage designated generally by the reference character 86 is movable on the tracks 84, being equipped with a plurality of traveling wheels 88. As is best shown in Figures 3 and 4, the carriage 86 is elongated and consists of what may be called an inner portion 90 and an outer portion 92, the inner portion 90 of the carriage being receivable in the oven 28 when the carriage is slid inwardly on the tracks 84.

The inner portion 90 of the carriage 86 provides a bearing for a vertical shaft 94, to the lower end of which is secured a meat supporting member assuming the form of a wheel 98. This wheel is provided with a peripheral rim and a plurality of spokes from which pieces of meat, indicated at 100, may be suspended by means of suitable hooks 102.

The shaft 94 is operatively connected by suitable gearing 104 to a horizontal countershaft 106 which extends from the inner to the outer portion of the carriage 86 and is driven through the medium of a reduction gear box 108 by an electric motor 110.

The motor 110 is mounted on the outer portion of the carriage 86 and the motor, together with the reduction drive unit 108, are covered by a suitable housing 112 provided with a convenient handle 114, whereby the entire carriage 86 may be slid inwardly and outwardly on the tracks 84. It will be apparent that by virtue of this arrangement, the motor 110 will slowly rotate the wheel 98 carrying the meat 100, so that the meat will be subjected evenly to the high temperature in the oven during the barbecuing operation.

Figure 8:
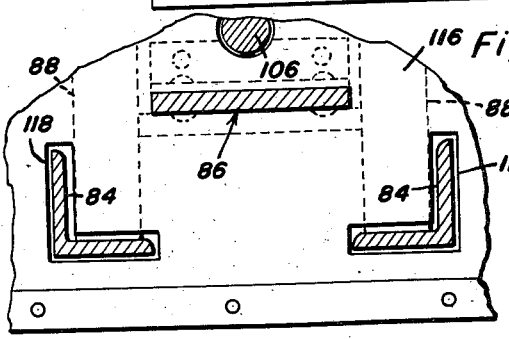
Figure 8 is a fragmentary cross-sectional view, taken substantially in the plane of the line 8—8 in Figure 4.

It is to be noted that a closure 116, similar in construction to the walls of the oven 28 and fire box 24, is mounted intermediately the length of the carriage 86, this closure being receivable in the recess 82 and completely closing the recess when the carriage 86 is slid inwardly. The closure 116 is formed with openings 118 (see Figure 8) which are sufficiently large to provide clearance for the tracks 84 when the carriage 86 is slid along the tracks, and as is best shown in Figure 4, the edges of the closure 116 as well as the edges of the opening 82 may be inwardly tapered so as to secure a proper fit.

Provided substantially below the wheel 98 in the oven 28 are a pair of channel-shaped guides 120, into which may be slid a grille 122 (see Figure 7) for broiling meat, as indicated at 124 in Figure 3. This grille may be readily withdrawn by simply opening the open door 80, and in this connection it may be noted that this door, in addition to its primary function of providing access to the interior of the oven, also performs a second function, namely, that of preventing the carriage 86 from being withdrawn from the oven while the oven door 80 is closed. This is achieved by simply having the upper edge portion 124 overlap the lower edge portion of the closure 116 when the oven door is closed so that the carriage 86 cannot be withdrawn, as will be clearly apparent from Figures 3 and 4.

The broiling grille 122 is equipped with an externally accessible handle 126, this being secured to a panel 128 which normally closes the opening in the oven wall through which the grille 122 may be withdrawn.

In addition, an inclined drip pan 130 may be provided in the lower end of the oven 28, this drip pan communicating with or emptying into a suitable receptacle 132 which is removably positioned in an enclosure 134 provided externally at the bottom of the oven. The receptacle 132 may be equipped with convenient handles 136, and a hinged door 138 is provided immediately above the enclosure 134 so that access may be had to the drip pan 130 for the purpose of scraping residue therefrom, as will be clearly apparent.

If desired, the sides of the oven 28 as well as the oven door 80 may be equipped with transparent panels 138, 140, respectively, so that the barbecuing operation may be readily observed.

It is believed that the advantages and use of the invention will be clearly understood from the foregoing disclosure and, accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. In a barbecue machine, the combination of an oven having a side wall provided with a door and with a recess disposed above and constituting a continuation of the door opening, horizontal tracks provided in said oven and extending outwardly through said recess, a carriage movable on said tracks and consisting of an outer portion and an inner portion receivable in said oven, the inner portion of said carriage supporting a rotatable vertical shaft, a meat supporting member secured to said shaft, a motor mounted on the outer portion of said carriage, and an operative connection between said shaft and said motor.

2. The device as defined in claim 1 together with a closure block provided on said carriage between the inner and outer portions of the latter, said operative connection extending through said block and said block affording a closure for said recess when said carriage is in its inwardly slid position.

3. The device as defined in claim 2, wherein an edge portion of said door when closed overlaps said closure block.

4. In a barbecue machine, the combination of an oven having a side wall provided with a door opening and with a recess disposed above and constituting a continuation of said door opening, a pair of transversely spaced horizontal rails provided in said oven and extending outwardly through said recess, an elongated wheeled carriage movable inwardly and outwardly on said tracks, a closure block secured intermediate the ends of said carriage and affording a closure for said recess when the carriage is moved inwardly, said block being provided with a pair of transversely spaced clearance openings for the respective rails, a hinged door provided on said side wall for said door opening, an upper edge portion of said door overlapping said block when the door is closed whereby to prevent outward movement of said carriage, an electric motor mounted on the outer end portion of the carriage, a horizontal shaft operatively connected to said motor, said shaft being journalled longitudinally on said carriage and extending ingitudinally through said block, a rotatable meat supporting member provided on the inner end portion of said carriage, and an operative connection between said meat supporting member and said shaft.

GEORGE C. KOCH.

REFERENCES CITED

The following references are of record in the file of this patent:

UNITED STATES PATENTS

| Number | Name | Date |
|---|---|---|
| 114,972 | Robertson | May 16, 1871 |
| 175,050 | Dejeu | Mar. 21, 1876 |
| 632,955 | Wulff | Sept. 12, 1899 |
| 1,068,272 | Rayson | July 22, 1913 |
| 1,595,846 | Wood | Aug. 10, 1926 |
| 1,822,355 | Mayhew | Sept. 8, 1931 |
| 2,179,646 | Spartalis | Nov. 14, 1939 |
| 2,201,801 | Stravrou | May 21, 1940 |
| 2,305,056 | Austin | Dec. 15, 1942 |
| 2,330,132 | Martin et al. | Sept. 21, 1943 |
| 2,338,156 | Allen | Jan. 4, 1944 |
| 2,348,545 | Kahn | May 9, 1944 |
| 2,352,590 | Trinkle | June 27, 1944 |
| 2,398,508 | Shoemaker | Apr. 16, 1946 |